Dec. 7, 1943.    P. W. THORNHILL    2,336,137
SHOCK ABSORBING SUSPENSION DEVICE FOR VEHICLES
Filed Jan. 6, 1943    2 Sheets-Sheet 1

Inventor
Peter Warborn Thornhill
by Stevens and Davis
his attorneys

Dec. 7, 1943.   P. W. THORNHILL   2,336,137
SHOCK ABSORBING SUSPENSION DEVICE FOR VEHICLES
Filed Jan. 6, 1943   2 Sheets-Sheet 2

Inventor
Peter Warborn Thornhill
by Stevens and Davis
his attorneys

Patented Dec. 7, 1943

2,336,137

UNITED STATES PATENT OFFICE 2,336,137

SHOCK ABSORBING SUSPENSION DEVICE FOR VEHICLES

Peter Warborn Thornhill, Leamington Spa, England, assignor to John Henry Onions, Coventry, England Application January 6, 1943, Serial No. 471,484
In Great Britain September 8, 1941

14 Claims. (Cl. 267—64)

This invention relates to shock absorbing devices of the kind (hereinafter mentioned as the kind referred to) in which the "stroke" of the shock absorber varies the volume of a working space filled with damping liquid, said liquid communicating through a damping valve device with a chamber which contains damping liquid maintained under pressure by resilient means, such as a quantity of compressed air, the damping valve device being provided in a piston head slidable within a cylinder. Such shock absorbing devices are used for road vehicles, the landing gear of aircraft, and like purposes, the resilient means normally being arranged to serve as a spring for supporting the gravitational load on the wheel or equivalent.

It is an object of the present invention to provide a form of shock absorber in which a quantity of compressed gas confined within a container to control the action of the damping valve device, also participates in supporting the load resiliently.

It is a further object of the invention to provide an improved form and construction of damping valve device which is adaptable and is found to be efficient in operation. In particular the noise emitted by the working parts is less than usual and the operation of the device is such that undesirable momentum of the vehicle or equivalent is rapidly neutralised after a shock has been experienced. The invention also sets out to provide constructional improvements in shock absorbing suspension units and it contemplates an arrangement for reversing the action of the usual form of telescopic shock absorber.

In a shock absorbing device of the kind referred to, according to the present invention the damping valve comprises a pair of disc-like or flanged valve members movable relatively in an axial sense and operating within a passage formed in the piston head.

There is further provided according to the invention a shock absorbing device of the kind referred to, wherein the damping valve comprises a cylindrical passage extending through the piston head, an axial rod extending through said passage, a pair of valve members slidable upon the rod and each arranged to close the passage substantially completely, and resilient means urging said valve members apart so that they are normally spaced by a distance substantially equal to the length of the cylindrical passage.

According to a further aspect of the invention, in a shock absorbing device of the kind referred to, a control piston, which is subject to the pressure of a quantity of fluid within a substantially closed container, is mechanically connected with, and controls the operation of, a damping valve comprising a pair of valve members mounted co-axially and urged apart by resilient means, said valve members being arranged to co-operate with the wall of a passage through the piston head so as to retard or prevent the flow of damping liquid through said piston head.

As a further feature, in a shock absorbing device of the kind referred to, in which a plunger tube contains gas under pressure arranged to support the load resiliently, and in which said gas pressure acts upon a control piston adapted to control the damping valve device, the present invention is characterised by the fact that the control piston divides the gas space into two parts, and has a free stroke which is sufficiently long to enable it to equalise substantially the gas pressures on its opposite faces during plunger movements of any magnitude (up to the maximum permissible stroke of the shock absorber) away from its static position.

If desired each of the valve members may comprise a pair of parts which are separable in an axial direction to allow liquid to flow past said valve member; thus each valve member may comprise a circular inner member and an outer annular member arranged to mate with the inner member, the inner members conveniently being urged resiliently apart in an axial direction, as also are the outer members.

Preferably a coiled compression spring is interposed between the valve members of the damping valve device to urge them apart normally into engagement with a pair of stops, one of said stops conveniently being constituted by a spider member which slides within the plunger and locates the valve members centrally with respect to the piston head.

The invention is illustrated by way of example in the accompanying diagrammatic drawings, in which.

Figure 1:
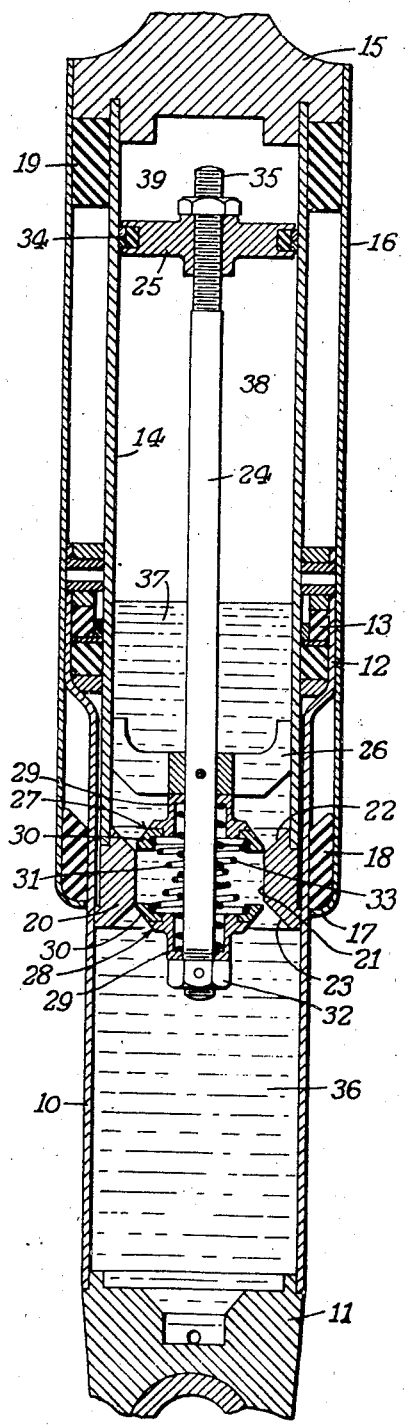
Figure 1 is a sectional elevation of one form of telescopic shock absorber, the parts being in their normal static position.
Figure 2:
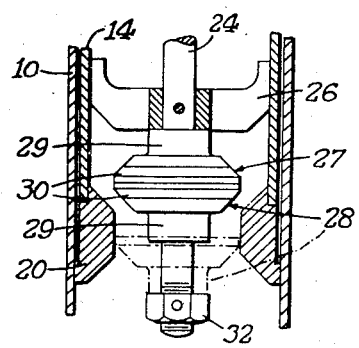
Figure 2 is a fragmentary sectional elevation of the damping valve device with the valve members in one of their operating positions.

In the construction shown in Figures 1 and 2 the shock absorbing device comprises a cylinder tube 10, which is closed at its lower end by a plug 11, the latter serving as the lower attachment member in the usual manner. At its upper end the cylinder tube 10 is enlarged in diameter, as indicated at 12, for the reception of a packing 13 which engages slidably with a plunger tube 14 slidable telescopically within the cylinder tube 10. The upper end of the plunger tube 14 is closed by a plug member 15 serving as the upper attachment of the device, while a shroud tube 16, secured at its upper end to the plunger tube 14, extends downwardly past the enlarged portion 12 of the cylinder tube 10, said shroud tube having its lower end turned inwardly as indicated at 17, so as to retain a resilient ring 18 adapted to act as a buffer by engagement with the enlarged portion 12 as the shock absorbing device reaches its maximum extension. A resilient buffer ring 19 is also fitted within the upper portion of the shroud tube 16 so as to be engaged by the upper end of the cylinder tube 10 when the shock absorber is fully compressed.

An annular member 20 is secured to the lower end of the plunger tube 14 so as to serve as a piston head, which latter has a cylindrical passage or bore 21 of substantial length extending coaxially with respect to the plunger tube 14 and cylinder tube 10. Beyond the upper and lower ends of the passage 21 the piston head 20 is chamfered, as indicated at 22 and 23 respectively. The passage 21 has a cross-sectional area which is less than that of the interior of the plunger tube 14 and the preferred ratio is 1:2, as will be hereinafter explained.

An axial rod 24, to the upper end of which a control piston 25 is secured, extends downwards through the passage 21 and is accurately located in a coaxial position by means of a three-armed spider member 26 secured to the rod 24. Below the spider member 26 the rod 24 is fitted with a pair of freely slidable damping valve members, which are indicated at 27 and 28, these being flanged or disc-like so that their peripheral parts are just able to slide freely through the cylindrical passage 21. In the form of damping valve device shown in Figures 1 and 2, each of the valve members 27 and 28 comprises an inner member 29 which slides upon the rod 24, and an annular outer member 30 adapted to seat itself concentrically upon the corresponding inner member 29. The inner members 29 are urged apart by a coiled compression spring 31, so that the upper of said members tends to engage with the spider member 26, while the lower is forced against a nut 32 serving as a stop upon the lower end of the rod 24. The outer members 30 are similarly urged apart in an axial direction by a coiled compression spring 33, which is shaped in the manner of a grooved pulley so that it is capable of assuming a substantially flat form when it is fully compressed. When the valve members 27 and 28 are in their fully separated positions, as shown in Figure 1, the periphery of each is disposed adjacent, or just outside, the corresponding end of the cylindrical passage 21, the axial spacing of the peripheral parts of the two valve members thus being approximately equal to the length of said cylindrical passage 21.

The control piston 25, which of course slides in the upper part of the plunger tube 14, is circumferentially grooved for the reception of a packing device 34 which is adapted to allow a slow leakage of air from one side of the piston to the other. The maximum stroke of the piston 25 is determined on the one hand by the engagement of the upper end 35 of the axial rod 24 with the under surface of the plug member 15, and on the other hand by the engagement of the spider member 26 with the oblique surface 22 of the piston head 20. The variable volume space 36 within the cylindrical tube 10 is completely filled with damping liquid, which extends through the piston head 20 and partially occupies the interior of the plunger tube 14, as indicated at 37. The space 38 above the damping liquid is charged with compressed air or other gas, which, owing to the leaky nature of the packing 34, enters a working space 39 above the control piston 25, the pressure in the space 39 becoming after a short time equal to that in the space 38.

The control piston 25 is arranged to have a relatively long free stroke in either direction away from its normal or static position shown in Figure 1, and the improved form of damping valve device operates in the desired manner irrespective of the position occupied by the control piston 25. It will be realised that with this arrangement the air pressures in the spaces 38 and 39 are at all times substantially equal, as variations of the pressure in the space 38 cause the control piston 25 to be displaced until such equalisation is achieved; this enables the fixed quantity of air trapped in the space 39 to take its full share in resiliently supporting the axial load on the shock absorber, and thus reduces the total air space which is required for any given set of operating conditions. In order to secure this result, the total displacement of the control piston should not be less than the value derived by taking the maximum displacement of the plunger (in moving from the fully extended position to the fully shortened position), dividing it by the total air space in the plunger (when the shock absorber is bearing its static load) and multiplying it by the volume of the air space 39 (also when the shock absorber is bearing its static load). As, in construction shown in Figure 1, the outside cross-sectional area is approximately the same as the cross-sectional area of the air space 39 (ignoring the thickness of the plunger tube wall), the above relationship can be written:

$$\text{Minimum free stroke of control piston} = \frac{\text{Max. stroke of plunger} \times \text{axial length of space 39}}{\text{Total axial length of air space}}$$

When the shock absorber is installed on a vehicle the axle or like wheel-carrying member is secured to the plug 11 of the cylinder tube 10, while the plug 15 is attached to the chassis frame, vehicle body or the like. Thus the static load which is taken by said wheel causes the plunger tube 14 to be moved telescopically into the cylinder tube 10, so transferring damping liquid from the cylinder tube 10 to said plunger tube until the pressure of the compressed air in the space 38 is sufficient to support said static load; after a short time this pressure is also present in the space 39, owing to the leaky nature of the packing 34.

Should a bump be encountered when the vehicle is travelling, the shock imparted to the wheel causes the cylinder tube 10 to move upwards relative to the plunger tube 14, thus shortening the shock absorber. In order to reduce as far as possible the transmission of upward thrust by the shock absorber, liquid is allowed to escape relatively freely from the cylinder space 36 into the plunger tube 14, this flow of liquid acting upon the lower valve member 28 and lifting it until it assumes the position shown in Figure 2, where its periphery is disposed above the cylindrical passage 21. Actually the valve members 27 and 28 are brought into engagement, and both are lifted clear of said passage 21 so as to permit the rapid transference of damping liquid. The entrance of additional damping liquid into the space 37 causes the compressed air in the spaces 38 and 39 to have its pressure increased, with a resulting decrease in volume, which, being divided between the air in the spaces 38 and 39, causes the piston 25 to rise, together with the axial rod 24. It will be appreciated that these pressure variations occur very rapidly and therefore the quantity of air in the space 39 above the control piston 25 remains substantially unchanged.

As the shortening stroke of the shock absorber comes to a finish transference of liquid from the cylinder space 36 ceases and the lower valve member 28 is returned into engagement with the stop 32, as indicated in broken lines in Figure 2. Owing to the fact that the pressure of the compressed air in the space 38 (and also of the liquid in the space 37) is greater than the static value, the control piston 25 remains in its raised position, so that liquid is at first unable to escape from the plunger tube 14 back into the cylinder space 36. The pressure in the latter therefore drops rapidly as the recoil or extension stroke commences, the extent to which the pressure in the cylinder space 36 is allowed to fall below the normal static value being arranged to depend upon the extent to which the shock absorber was shortened during the preceding stroke, this action being attained by making the cross-sectional area of the passage 21 less than that of the control piston 25, as explained above. Thus as the liquid pressure diminishes in the cylinder space 36, the pressure of the air in the space 39 above the control piston 25, aided by the fact that there is a deficit of pressure acting below the lower valve member 28, is able to force said control piston 25 downwards until the periphery of the lower valve member 28 becomes clear of the cylindrical passage 21 in the piston head 20; the control piston 25 has, of course, returned to its normal riding or static position, so that the air pressure in the space 39 has dropped to its static value. The flow of damping liquid from the space 37 back into the cylinder space 36 is automatically regulated so that the liquid pressure in the cylinder space 36 is at all stages less than the static value by an amount approximately equal to the extent by which the air pressure in the space 38 exceeds said static value. If the pressure in the cylinder space 36 should rise too rapidly the lower valve member 28 would be lifted to reclose the passage 21. Thus the pressure in the cylinder space 36 increases towards its static value at the same time as the pressure in the space 38 decreases towards its static value, and both pressures attain their static values when the shock absorber reaches its static position.

A similar but opposite action occurs when the vehicle wheel crosses a depression or pothole, for in this case the shock absorber is allowed to extend freely, the fluid pressure in the plunger tube 14 causing damping liquid to force down the upper valve member 27 and flow into the cylinder space 36; this, of course, lowers the air pressure in the space 38 so that the control piston 25 is moved downwards by the air in the space 39. As a consequence, when the extending movement ceases the upper valve member 27 is held by the spider member 26 in a depressed position, where it completely blocks the passage 21, and the liquid from the cylinder space 36 is thus prevented from escaping freely during the succeeding recoil stroke. On the contrary it has to build up a pressure which is sufficient to raise the valve member 27, and with the arrangement described this can only occur when the pressure of the liquid in the cylinder space 36 is as much in excess of the static pressure as the fluid pressure in the plunger tube 14 is below said static pressure.

The reason for delaying the recoil stroke in this regulated manner when the vehicle wheel has encountered either a bump or depression, is to counteract as exactly as possible the undesirable momentum (in a vertical sense) which was acquired by the vehicle body during the initial stroke of the shock absorber. Thus when a bump is encountered the effect of the upward momentum acquired by the vehicle body is counteracted by causing the liquid pressure in the cylinder space 36 to fall during the recoil stroke to a value which is much below that necessary to support the normal static load on the shock absorber. Likewise when the wheel enters a depression the vehicle body acquires momentum in a downward direction, and this is counteracted by maintaining in the cylinder space 36 during the recoil stroke a liquid pressure which is substantially greater than that necessary to support the static load.

When the shocks encountered by the wheel are relatively small, the consequent variations in the fluid pressure in the device may be insufficient to move the axial rod 24 through a distance greater than the length of the passageway 21 in the piston head 20, and each of the damping valve members 27, 28 is therefore made in two parts 29 and 30 in order to secure efficient compensation under these conditions. Thus when either of the valve members 27 or 28 returns into engagement with its stop 26 or 32, it would, if solid, have to displace liquid in moving along the passage 21; however, by making the outer annular parts 30 readily separable each of the inner parts 29 can first move under the action of the spring 31, the corresponding outer part 30 following separately under the action of the spring 33. In this way the valve members 27 and 28 are, during riding conditions, maintained in contact with their stops as much as possible, and this to a large extent avoids noise and chatter of the parts when the wheel encounters a bump or depression. Moreover the instantaneous movement of the valve on to its stop prevents any initial free flow of liquids which would allow some extent of undamped movement.

Figure 3:
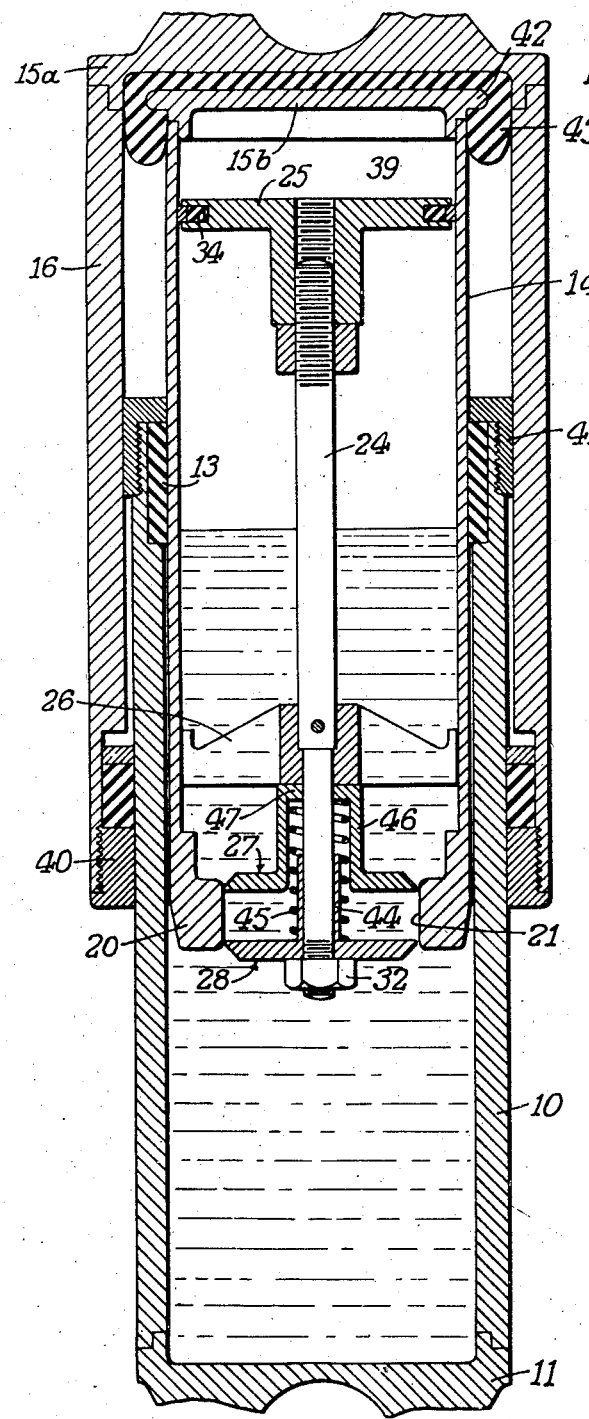
Figure 3 is a sectional elevation of a modified construction of shock absorber.

A slightly modified form of telescopic shock absorber is shown in Figure 3; the action, however, is substantially the same as in the preceding example. The cylinder tube 10 is provided as before with a plug 11, which serves as the lower attachment of the shock absorber, but the upper attachment is constituted by a plug 15a secured to the shroud tube 16. This tube is fitted with a bearing bush or collar 40 which slides upon the outside of the cylinder tube 10, while the latter has at its upper end a bearing bush 41 slidably engaging with the interior of the shroud tube 16. As the cylinder tube 10 and shroud tube 16 are both thick walled, and as the bushes 40 and 41 are well spaced in an axial sense, said cylinder and shroud tubes together are capable of withstanding a relatively large bending moment, while the internal parts of the shock absorber are efficiently protected from damage.

The plunger tube 14, which is relatively thin, is closed at its upper end by a plug 15b having a flange 42 embedded in a rubber or like cushion member 43 adapted to allow the plunger tube 14 to align itself freely with the cylinder tube 10. The piston head 20 is again annular in form and is provided with a cylindrical passage 21, with which co-operates a pair of valve members 27 and 28. These are again disc-like, but are of different form, the lower valve member 28 being provided with a sleeve 44 which slides upon the axial rod 24 and which is surrounded by a coiled compression spring 45. The upper valve member 27 has a sleeve 46 which is sufficiently large in internal diameter to pass freely over the spring 45, and which has an inwardly extending portion 47 at its upper end adapted also to slide freely upon the rod 24. A spider member 26 accurately locates the axial rod 24 and also serves as a stop for the upper valve member 27, while a nut 32 acts as a corresponding stop for the lower valve member 28. A control piston 25 at the upper end of the axial rod 24 carries a peripheral packing 34 arranged to leak slightly, as in the previous example, so as to maintain in the space 39 (when the shock absorber is in a steady condition) an air pressure which corresponds to the normal static loading of the shock absorber.

Figure 4:
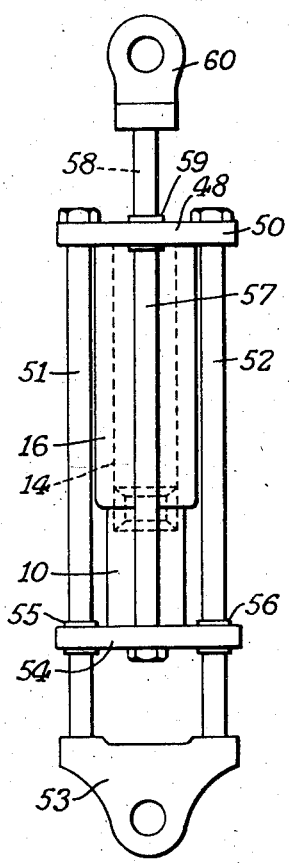
Figure 4 is an outside view of a further modified arrangement of shock absorbing device.

In the arrangement shown in Figure 4 a telescopic shock absorber of the form above described is provided with means whereby separating movement of the attachment members is accompanied by a shortening of the shock absorber proper, i. e. by the production of a rise in pressure within the cylinder space of said shock absorber. The cylinder tube is again indicated at 10 and the shroud tube at 16. The latter, and the plunger tube 14, are secured to a head 48 having a pair of diametrically opposite ears 50. A pair of tension rods 51 and 52 extend from these ears, alongside the shroud tube 16 and cylinder tube 10, and have their opposite ends firmly secured to a terminal element 53 forming the lower attachment member of the shock absorber. A crosshead 54 is secured to the bottom of the cylinder 10 and is arranged to slide upon the rods 51 and 52, bushes 55 and 56 being provided for this purpose. At diametrically opposite positions spaced equally from the rods 51 and 52 the crosshead 54 is fitted with a pair of tension members 57 and 58, which extend upwards parallel with said rods 51 and 52 and pass through bushes in the head 48, one of said bushes being indicated at 59. The upper ends of the tension rods 57 and 58 are secured to a terminal element 60 forming the upper attachment of the device. It will be seen that the tension rods 51, 52 and 57, 58 are arranged in overlapping relationship, and that when the terminal elements 53 and 60 are pulled apart, the plunger tube 14 is forced into the cylinder tube 10, thus shortening the shock absorber proper; conversely movement of the terminal elements 53 and 60 towards one another results in a lengthening of the shock absorber. This form of mounting is of course particularly useful where it is desired that the liquid damping during heavy extending recoil strokes of the shock absorbing device as a whole shall be efficiently controlled.

It will be understood that various modifications may be made and that the constructions which are described herein are given merely by way of example. The improved suspension device is found to be efficient in operation and is relatively silent, a feature which is attributed to the fact that noise can be produced only by the engagement of the valve members with the stops on the axial rod, and the whole assembly of the rod, valves and control piston is, in effect, floating in the fluid space 37, 38, with no metal-to-metal contact with the casing. Any sound produced is thus efficiently damped out by the air and liquid.

What I claim is:

1. A shock absorbing device of the kind referred to comprising a cylinder, a plunger tube containing gas under pressure arranged to support the load resiliently, said cylinder and plunger tube being slidably engaged and defining a working space of variable volume, wherein is contained both liquid and gas, a piston head on the inner end of the plunger tube, means forming a cylindrical passage extending through said piston head, an axial rod extending through said passage, a damping valve device to control the flow of liquid comprising a pair of flanged valve members slidable upon said rod adjacent one end thereof and each member arranged to close the passage substantially completely, resilient means urging said valve members apart so that they are normally spaced by a distance substantially equal to the length of the cylindrical passage, stop means secured to said rod adjacent the ends of each flanged valve member to limit the movement of the valve member, said valve members being arranged to cooperate with the wall of said passage so as to retard or prevent the flow of damping liquid through said passage, a control piston dividing the gas space into two parts and being secured to said axial rod adjacent the other end thereof and controlling said damping valve device.

2. A shock absorbing device as claimed in claim 1, said control piston having a free stroke which is sufficiently long to enable it to equalize substantially the gas pressure on its opposite faces during plunger movements of any magnitude away from its static position.

3. A shock absorbing device as claimed in claim 1, wherein the damping valve device is so connected to the control piston that the said valve device remains closed during a recoil stroke of the shock absorber, until the control piston assumes its normal static position within the plunger.

4. A shock absorbing device as claimed in claim 1 wherein each of the valve members comprises a pair of parts which are separable in an axial direction to allow liquid to flow past said valve member.

5. A shock absorbing device as claimed in claim 1 wherein each valve member comprises a circular inner member and an outer annular member arranged to mate with the inner member.

6. A shock absorbing device as claimed in claim 1 wherein each valve member comprises a circular inner member and an outer annular member arranged to mate with the inner member, the inner members being urged resiliently apart in an axial direction as are also the outer members.

7. A shock absorbing device as claimed in claim 1, the resilient means comprising a coil compression spring interposed between the valve members to urge them apart normally into engagement with said stop means.

8. A shock absorbing device as claimed in claim 1, said stop means including as one element a spider member which slides within said cylinder and locates the valve member centrally with respect to the piston head.

9. A shock absorbing device as claimed in claim 1, at least one of said valve members being disposed within the length of the passage through the piston head when both valve members are in engagement with their stop means.

10. A shock absorbing device as claimed in claim 1, said axial rod having one end engageable with an end wall of the plunger tube which latter carries the piston head at the opposite end, said rod being fitted with stop means including as one element a spider member which is engageable with said piston head to limit axial movement of the rod in the opposite direction.

11. A shock absorbing device as claimed in claim 1, wherein the cross sectional area of the control piston is substantially twice the corresponding area of each of the valve members.

12. A shock absorbing device as claimed in claim 1 in which a shroud tube secured to the plunger tube is in rubbing engagement with the cylinder over a substantial axial length, so as to render the cylinder and shroud tube together capable of resisting heavy bending moments.

13. A shock absorbing device as claimed in claim 1 in which a shroud tube secured to the plunger tube is in rubbing engagement with the cylinder over a substantial axial length, so as to render the cylinder and shroud tube together capable of resisting heavy bending moments, the shroud tube being attached rigidly to a terminal fitting of the device and the plunger tube being resiliently connected with said fitting.

14. A shock absorbing device as claimed in claim 1, wherein over-lapping tension members have their outwardly directed ends arranged as attachments of the device while their other ends are connected respectively with the cylinder and the plunger tube.

PETER WARBORN THORNHILL.